United States Patent
Taylor et al.

(10) Patent No.: US 9,830,167 B2
(45) Date of Patent: Nov. 28, 2017

(54) ENHANCING A MULTITASKING USER INTERFACE OF AN OPERATING SYSTEM

(71) Applicant: LinkedIn Corporation, Mountain View, CA (US)

(72) Inventors: Kamilah Joanna Marie Taylor, San Francisco, CA (US); Dimitry Dany Fridman, San Francisco, CA (US); Joseph Farquharson, San Francisco, CA (US); Ehud Milo, Sunnyvale, CA (US)

(73) Assignee: LinkedIn Corporation, Sunnyvale, CA (US)

( * ) Notice: Subject to any disclaimer, the term of this patent is extended or adjusted under 35 U.S.C. 154(b) by 338 days.

(21) Appl. No.: 14/534,070

(22) Filed: Nov. 5, 2014

(65) Prior Publication Data

US 2016/0048398 A1 Feb. 18, 2016

Related U.S. Application Data

(60) Provisional application No. 62/036,560, filed on Aug. 12, 2014.

(51) Int. Cl.
*G06F 3/048* (2013.01)
*G06F 9/44* (2006.01)
*G06F 9/445* (2006.01)

(52) U.S. Cl.
CPC .............. *G06F 9/4443* (2013.01); *G06F 8/65* (2013.01)

(58) Field of Classification Search
CPC ..................................................... G06F 9/4443
See application file for complete search history.

(56) References Cited

U.S. PATENT DOCUMENTS

| | | | |
|---|---|---|---|
| 2012/0216146 A1* | 8/2012 | Korkonen | G06F 3/0482 715/835 |
| 2012/0260217 A1* | 10/2012 | Celebisoy | G06F 3/04815 715/836 |
| 2014/0007013 A1* | 1/2014 | Yun | G06F 3/04817 715/835 |

* cited by examiner

*Primary Examiner* — Peiyong Weng
(74) *Attorney, Agent, or Firm* — Schwegman Lundberg & Woessner, P.A.

(57) ABSTRACT

Techniques for enhancing a mufti-tasking user interface of an operating system are disclosed. An update data item pertaining to an application placed in the background on the device is received. An update image is generated to include information pertaining to the update data item. The update image is incorporated into a multitasking user interface of the operating system such that the update image is presented to a user and the user may view the information pertaining to the update data item before choosing whether to bring the application to the foreground.

14 Claims, 9 Drawing Sheets

ENHANCING A MULTITASKING USER INTERFACE OF AN OPERATING SYSTEM

CROSS-REFERENCE TO RELATED APPLICATIONS

This application claims the benefit of U.S. Provisional Application No. 62/036,560, filed Aug. 12, 2014, which is incorporated herein by reference in its entirety

TECHNICAL FIELD

This application relates generally to the technical field of graphical user interfaces and, in one specific example, to generating a graphical user interface for conveying information pertaining to updates received by an application placed in the background of an operating system executing on a device.

BACKGROUND

Many operating systems, such as Apple iOS, Google Android, and Microsoft Windows, support multitasking features that allow multiple applications to run and perform tasks simultaneously. Each of these multiple applications may have one or more states. For example, application states for iOS applications include "not running" (the application has not been launched or was terminated by the system), "inactive" (the application is running in the foreground but is currently not receiving events), "active" (the application is running in the foreground and is receiving events), "background" (the application is in the background and executing code), and "suspended" (the application is in the background but is not executing code). Examples of events that an active application may receive include notifications of user actions that manipulate the hardware of the device, such as touch events (triggered, e.g., when a user touches the touchscreen of the device), motion events (triggered, e.g., when a user moves the device), accelerometer events (triggered, e.g., when the accelerometer or gyroscope of the device sense changes) remote control events (triggered, e.g., when a user uses an external accessory to send remote control events to the device, such as by adjusting the volume through a headset).

In various scenarios, applications may transition from the foreground to the background or vice versa. For example, on an iOS device, a foreground application may transition to the inactive state and then the background state when the user presses the Home button on the device, when the user presses the Sleep/Wake button on the device, or when the operating system launches another application. Additionally, a background application may transition to the foreground when a user makes a request (e.g., by selecting the application from a list of background applications presented in a multitasking user interface).

DESCRIPTION OF THE DRAWINGS

Some embodiments are illustrated by way of example and not limitation in the FIG.s of the accompanying drawings, in which.

DETAILED DESCRIPTION

The present disclosure describes methods, systems and computer program products for enhancing a multitasking user interface of an operating system. In the following description, for purposes of explanation, numerous specific details are set forth in order to provide a thorough understanding of the various aspects of different embodiments of the present disclosure. It will be evident, however, to one skilled in the art, that the present disclosure may be practiced without all of the specific details and/or with variations permutations and combinations of the various features and elements described herein.

An operating system may support one or more user interfaces to enable multitasking, such as an application-launching user interface that allows a user to select an application installed on the device to be launched and brought to the foreground or an application-selection user interface that allows the user to select a previously-launched application to move from the background to the foreground. Applications that are in the background on a device may continue to perform tasks. For example, an application in the background may periodically request or be notified of updates pertaining to the application. Upon receiving an update, an application in the background may update a user interface element (e.g., badge of an icon associated with the application) to reflect the number of updates received. However, when viewing the icon (e.g., from the application-launching user interface), the user may not have any way to determine a context or type of the update received. Similarly, when viewing the icon from the application-selection user interface, the user may merely be presented with a screenshot of the last user interface of the application that was presented before the application was placed in the background. Because the screenshot indicates the state of the application before the update received, the user will not be able to glean any information about the update from the screenshot.

In various embodiments, techniques for enhancing a multi-tasking user interface of an operating system are disclosed. An update data item pertaining to an application placed in the background on the device is received. An update image is generated to include information pertaining to the update data item. The update image is incorporated into a multitasking user interface of the operating system such that the update image is presented to a user and the user may view the information pertaining to the update data item before choosing whether to bring the application to the foreground.

Other advantages and aspects of the present inventive subject matter be readily apparent from the description of the figures that follows.

Figure 1:
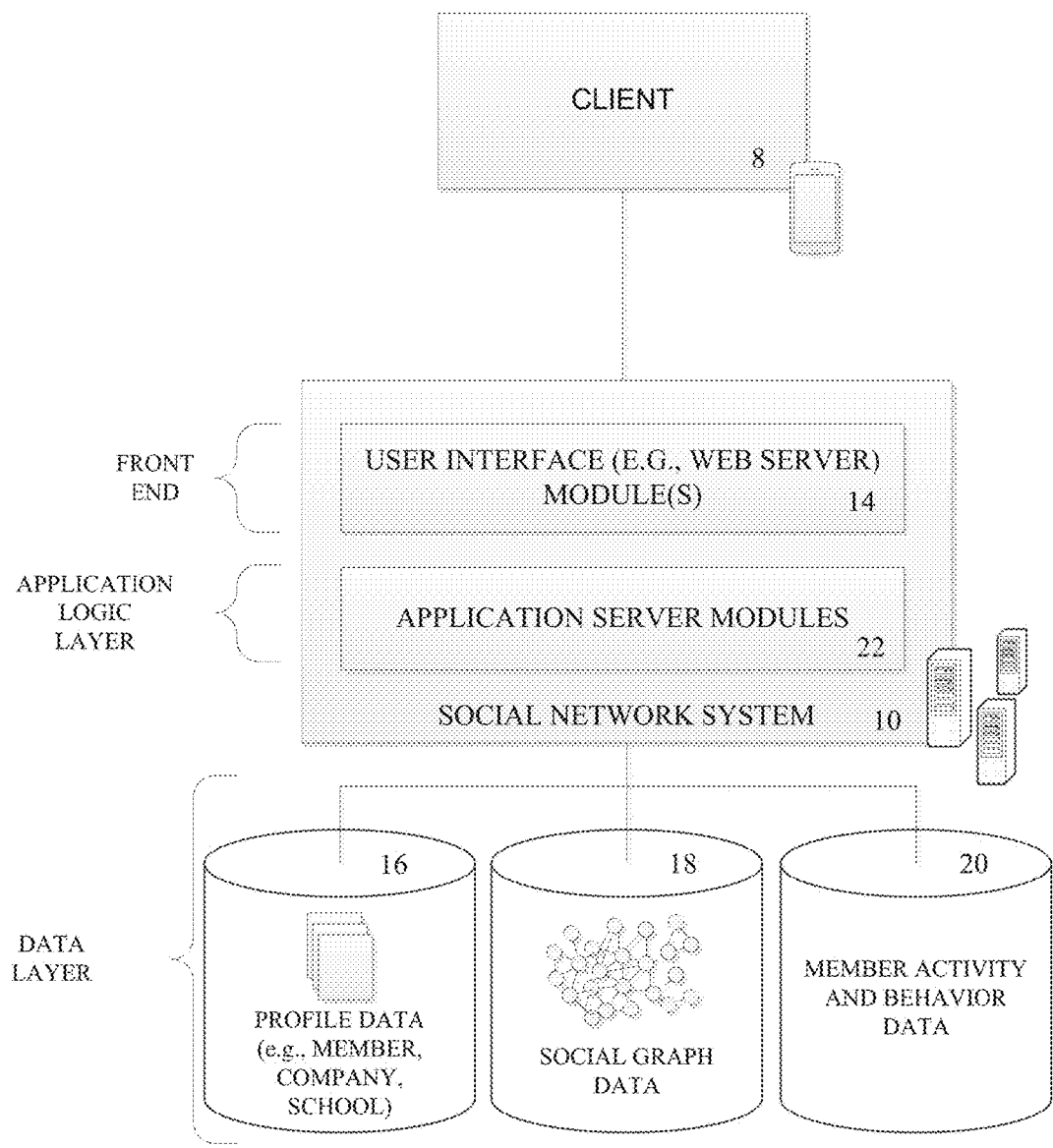
FIG. 1 is a block diagram of the functional modules or components that comprise a computer-network based social network service, including a search engine consistent with some embodiments.

FIG. 1 is a block diagram of the functional modules or components that comprise a computer- or network-based social network service 10, As shown in FIG. 1, the social network system 10 is generally based on a three-tiered architecture, comprising a front-end layer, application logic layer, and data layer. As is understood by skilled artisans in the relevant computer and Internet-related arts, each module or engine shown in FIG. 1 represents a set of executable software instructions and the corresponding hardware (e.g., memory and processor) for executing the instructions, To avoid obscuring the inventive subject matter with unnecessary detail, various functional modules and engines that are not germane to conveying an understanding of the inventive subject matter have been omitted from FIG. 1. However, a skilled artisan will readily recognize that various additional functional modules and engines may be used with a social network system, such as that illustrated in FIG. 1, to facilitate additional functionality that is not specifically described herein. Furthermore, the various functional modules and engines depicted in FIG. 1 may reside on a single server computer, or may be distributed across several server computers in various arrangements. Moreover, although depicted in FIG. 1 as a three-tiered architecture, the inventive subject matter is by no means limited to such architecture.

As shown in FIG. 1, the front end consists of a user interface module (e.g., a web server) 14, which receives requests from various client-computing devices (e.g., client 8), and communicates appropriate responses to the requesting client devices. For example, the user interface module(s) 14 may receive requests in the form of Hypertext Transport Protocol (HTTP) requests, or other web-based, application programming interface (API) requests. The client devices may be executing conventional web browser applications, or applications that have been developed for a specific platform to include any of a wide variety of mobile devices and operating systems.

As shown in FIG. 1, the data layer includes several databases, including one or more databases 16 for storing data relating to various entities represented in a social graph. With some embodiments, these entities include members, companies, and/or educational institutions, among possible others, Consistent with some embodiments, when a person initially registers to become a member of the social network service, and at various times subsequent to initially registering, the person will be prompted to provide some personal information, such as his or her name, age (e.g., birth date), gender, interests, contact information, home town, address, the names of the member's spouse and/or family members, educational background (e.g., schools, majors, etc), current job title, job description, industry, employment history, skills, professional organizations, and so on. This information is stored as part of a member's member profile, tier example, in the database with reference number 16. With some embodiments, a member's profile data will include not only the explicitly provided data, but also any number of derived or computed member profile attributes and/or characteristics.

Once registered, a member may invite other members, or be invited by other members, to connect via the social network service. A "connection" may require a hi-lateral agreement by the members, such that both members acknowledge the establishment of the connection. Similarly, with some embodiments, a member may elect to "Wow" another member. In contrast to establishing a "connection", the concept of "following" another member typically is a unilateral operation, and at least with some embodiments, does not require acknowledgement or approval by the member that is being followed. When one member follows another, the member who is following may receive automatic notifications about various activities undertaken by the member being followed. In addition to following another member, a user may elect to follow a company, a topic, a conversation, or some other entity. In general, the associations and relationships that a member has with other members and other entities (e.g., companies, schools, etc.) become part of the social graph data maintained in a database 18. With some embodiments a social graph data structure may be implemented with a graph database 18, which is a particular type of database that uses graph structures with nodes, edges, and properties to represent and store data. In this case, the social graph data stored in database 18 reflects the various entities that are part of the social graph, as well as how those entities are related with one another.

With various alternative embodiments, any number of other entities might be included in the social graph, and as such, various other databases may be used to store data corresponding with other entities. For example, although not shown in FIG. 1, consistent with some embodiments, the system may include additional databases for storing information relating to a wide variety of entities, such as information concerning various online or offline groups, job listings or postings, photographs, audio or video files, and so forth.

With some embodiments, the social network service may include one or more activity and/or event tracking modules, which generally detect various user-related activities and/or events, and then store information relating to those activities/events in the database with reference number 20. For example, the tracking modules may identify when a user makes a change to some attribute of his or her member profile, or adds a new attribute. Additionally, a tracking module may detect the interactions that a member has with different types of content. Such information may be used, for example, by one or more recommendation engines to tailor the content presented to a particular member, and generally to tailor the user experience for a particular member.

The application logic layer includes various application server modules 22, which, in conjunction with the user interface module(s) 14, generates various user interfaces (e.g., web pages) with data retrieved from various data sources in the data layer. With some embodiments, individual application server modules 22 are used to implement the functionality associated with various applications, services and features of the social network service. For instance, a messaging application, such as an email application, an instant messaging application, or some hybrid or variation of the two, may be implemented with one or more application server modules 22. Of course, other applications or services may be separately embodied in their own application server modules 22.

The social network service may provide a broad range of applications and services that allow members the opportunity to share and receive information, often customized to the interests of the member. For example, with some embodiments, the social network service may include a photo sharing application that allows members to upload and share photos with other members. As such, at least with some embodiments, a photograph may be a property or entity included within a social graph. With some embodiments, members of a social network service may be able to self-organize into groups, or interest groups, organized around a subject matter or topic of interest. Accordingly, the data for a group may be stored in a database (not shown). When a member joins a group, his or her membership in the group will be reflected in the social graph data stored in the database with reference number 18. With some embodiments, members may subscribe to or join groups affiliated with one or more companies. For instance, with some embodiments, members of the social network service may indicate an affiliation with a company at which they are employed, such that news and events pertaining to the company are automatically communicated to the members. With some embodiments, members may be allowed to subscribe to receive information concerning companies other than the company with which they are employed. Here again, membership in a group, a subscription or following relationship with a company or group, as well as an employment relationship with a company, are all examples of the different types of relationships that may exist between different entities, as defined by the social graph and modelled with the social graph data of the database with reference number 18.

The various application server modules 22 may include a search engine. With some embodiments, the search engine may include or have an associated publicly available application programming interface (API) that enables third-party applications to invoke the functionality of the search engine. With some embodiments, the search engine may be a people-search engine, and provide functionality to search for people (e.g., member profiles) specifically. Alternatively, the search engine module may facilitate searching for any type of information entity (e.g., people or member profiles, companies, schools and other educational institutions, etc.) that is maintained and used by the various applications of the social network system, such as companies, groups, job listings, etc. With such an embodiment, the user performing the search may specify the type of entity to be searched for. Alternatively, the search engine may algorithmically identify the type of search being performed, for example, based on the search query.

Figure 2:
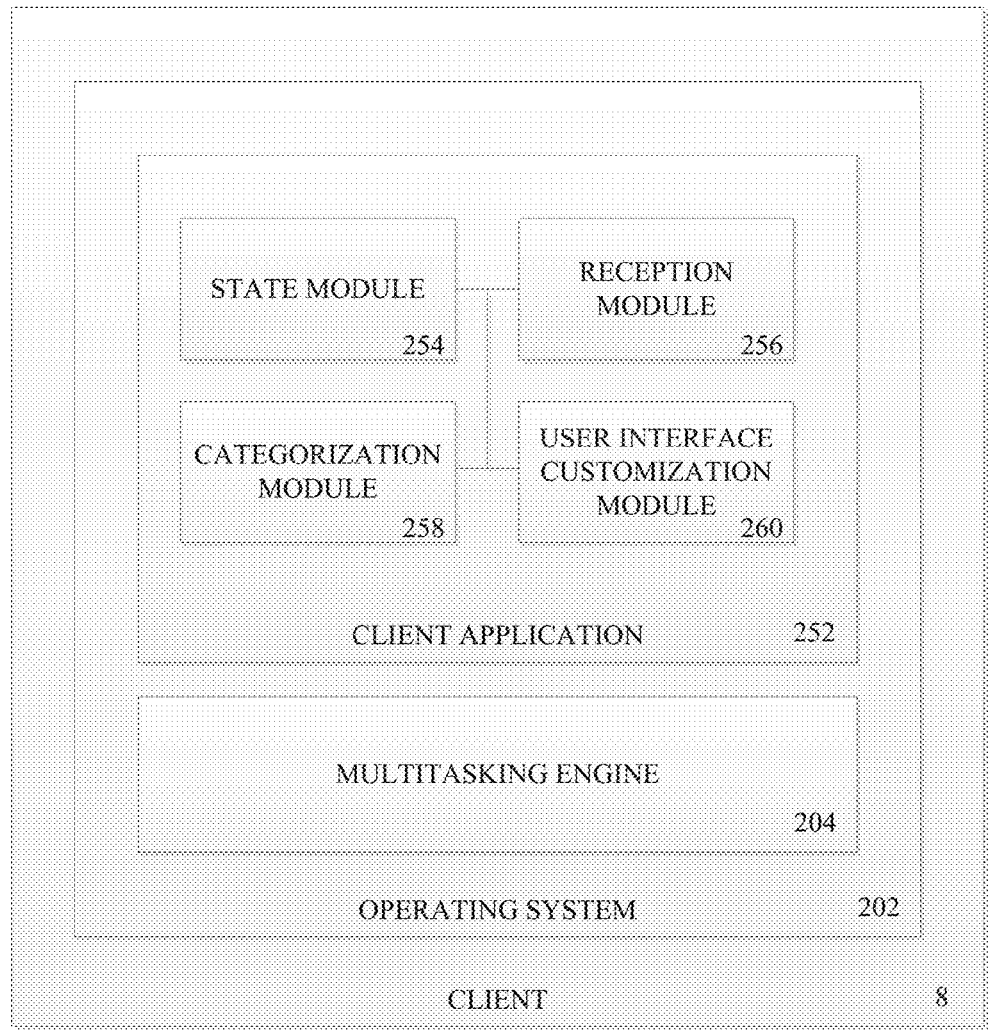
FIG. 2 is a block diagram illustrating example components of the client of FIG. 1.

FIG. 2 is a block diagram illustrating example components of the client 8 of FIG. 1. The client 8 may be, for example, a smartphone (e.g., an Apple iPhone, a Google Android phone, or a Microsoft Windows phone), a tablet computer (e.g., an Apple iPad, a Samsung Galaxy Tab, a Nook Table, a Blackberry Playbook, or a Kindle Fire), a desktop computer, or any other device. As illustrated in FIG. 2, the client 8 includes an operating system 202 (e.g., Apple iOS, Google Android, Microsoft Windows, Bada, Blackberry, Firefox OS, Palm OS, Sailfish OS, Symbian, or Tizen). The client 8 may include a client application 252. The client application 252 may be a native application of the device (e.g., an application that that is implemented specifically for the operating system that is executing on the device). Furthermore, the client application 252 may be configured to communicate with a server (e.g., application server modules 22) to access network services. Examples of client applications include messaging applications (e.g., an email or an instant messaging application), social networking applications (e.g., a LinkedIn or Facebook application), web browsing applications (e.g., Apple Safari, Google Chronic, or Microsoft Internet Explorer), news applications, audio applications, and so on.

As illustrated in FIG. 2, the operating system 202 may include a multitasking engine 204. The multitasking engine 204 may be configured to, among other things, allow a user to move applications from the background to the foreground or vice versa. For example, upon request from the user (e.g., based on the user double-clicking the Home button on an iOS device), the multitasking engine 204 may present a multitasking user interface, such as the user interface shown in FIG. 5. The multitasking user interface may allow the user to select an application to bring to the foreground. In various embodiments, the multitasking engine 204 may be configured to present a thumbnail of a screenshot of a user interface screen of the application, such as a screenshot image of the user interface being presented by the application when the application is placed into the background.

As illustrated in FIG. 2, the client application 252 may include astute module 254, a reception module 256, a categorization module 258, and a user interface customization module 260. The state module 254 may be configured to allow the client application 252 to handle changes of the state of the client application 252, such as a movement of the client application 252 from an active to inactive state or vice versa or a movement of the client application 252 from the foreground to the background or vice versa. In various embodiments, the state module 254 may perform tasks required of the client application 252 to be in compliance with policies promulgated by an administrator of the operating system 252. For example, if the client application 252 is an iOS application and the client application 252 is moving to the background, the state module 254 may (e.g., in accordance with policies promulgated by Apple) prepare the application to have its picture taken by the operating system (e.g., a screenshot image) for later use by the operating system in transition animations or later use by the operating system in a multitasking user interface (as described in more detail below), save user data and application state information, and free up as much memory as possible (e.g., remove strong references to objects that are no longer needed, such as image objects, large media or data files, or other objects that the client application 252 can recreate easily later).

Additionally, the state module 254 may be configured to communicate with the operating system 202 to allow the application 252 to perform tasks when it is in the background. For example, the state module 252 may declare to the operating system 202 the various types of background execution that the application supports, Thus, if the client application 252 is an iOS application, the background processing configuration module may be configured to specify which background modes (e.g., Xcode modes) the client application 252 supports, including audio, location updates, voice over IP, newsstand download, external accessory communication, Bluetooth networking, Bluetooth data sharing, background fetching, or remote notifications.

The reception module 256 may be configured to receive updates pertaining to the client application 252 while the client application 252 is in the background. For example, the reception module 256 may be configured to fetch small amounts of content regularly (e.g., based on permission being received from the operating system), receive push notifications and download new content pertaining to the push notifications, download newsstand content (e.g., newsfeed updates), and so on.

The categorization module 258 may be configured to analyze application updates to determine or associate an update type with each update or update data item. For example, for a social networking application, such as a LinkedIn application, types or categories of updates may include new stories (newsfeed updates), new connection requests, new endorsements, new messages, new job postings, and so on.

The user interface customization module 260 may be configured to customize a user interface of the operating system 202. For example, based on a receiving of an update pertaining to the application and a determination of a type of the update, the user interface customization module 260 may generate or modify an application update image to include an icon corresponding to the update type. Thus, for example, based on the application receiving an update while the application is in the background and determining that the update is of a message type, the user interface customization module 260 may generate an icon corresponding to the messaging type if one has not been generated already. Additionally, the user interface customization module 260 may generate or update a badge associated with the icon that represents a number of updates of the type that the application has received since the application was last in the foreground.

Additionally, the user interface customization module 260 may customize a multitasking user interface of the operating system to, for example, convey the update information to the user before the user chooses to bring the application back to the foreground on the device. For example, if the application is an iOS application, the user interface customization module 260 may replace the application snapshot taken by the operating system with the update image generated by the user interface customization module 260.

Figure 3:
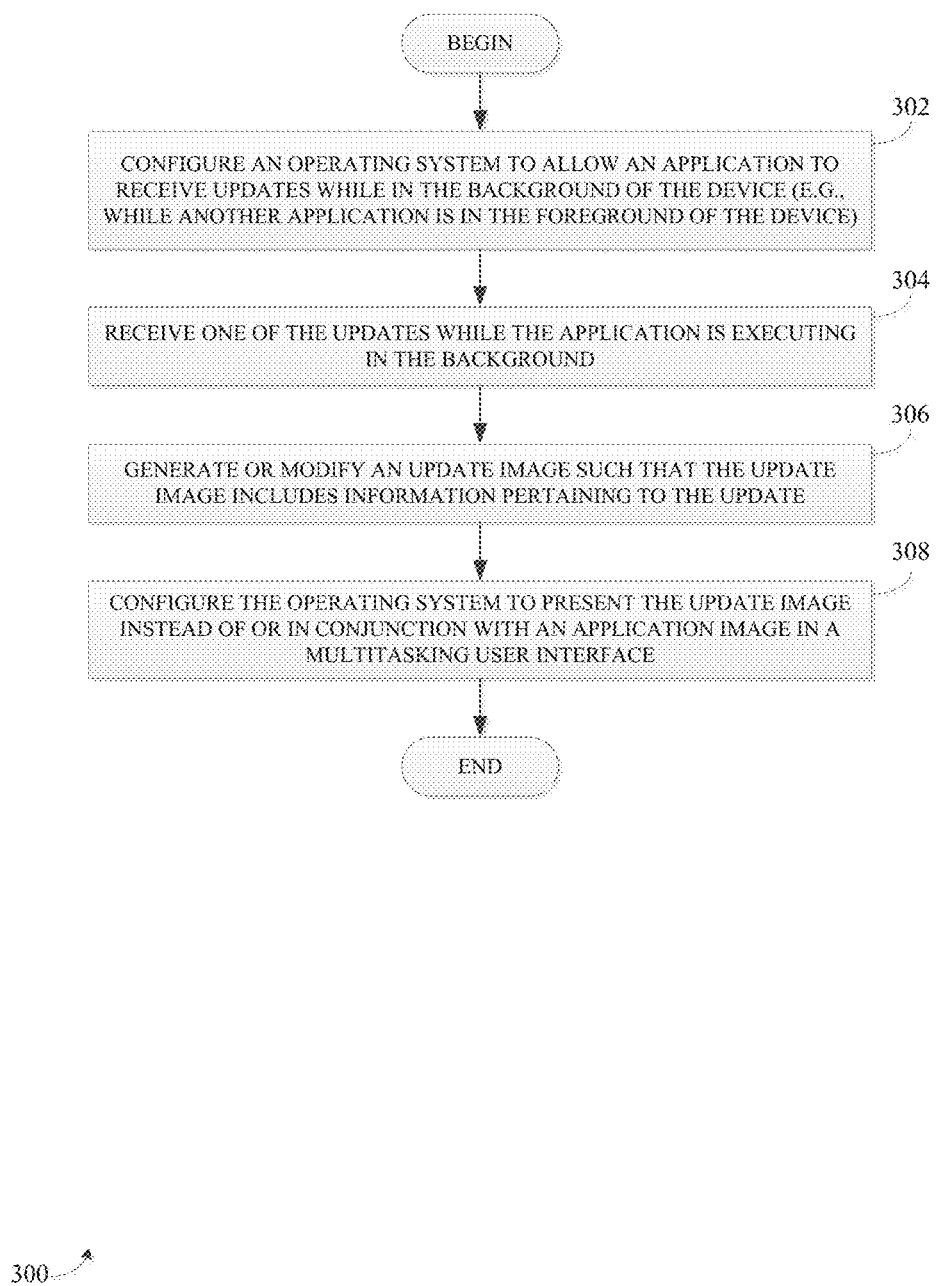
FIG. 3 is a flow diagram illustrating an example method of customizing a multitasking user interface of an operating system based on an update received by an application while the application is in the background.

FIG. 3 is a flow diagram illustrating an example method 300 of customizing a multitasking user interface of an operating system based on an update received by an application white the application is in the background. In various embodiments, the method 300 may be implemented by one or more of modules of the client application 252 depicted in FIG. 2.

At operation 302, the state module 254 configures the operating system 202 to allow the application to receive updates while the application is in the background. For example, the application registers with the operating system 202 to receive push notifications or to fetch data.

At operation 304, the reception module 256 receives an update pertaining to the application while the application is in the background. For example, the reception module 256 receives a notification that the user has received a new message or connection request. Or, as another example, the reception module 256 fetches new content, such as newsfeed content.

At operation 306, the user interface customization module 260 generates or modifies an update image such that the update image includes information pertaining to the update. For example, the user interface customization module 260 generates an icon corresponding to a type of the update (e.g., a story or news feed update icon, a message update icon, or a connection request icon). Additionally the user interface customization module 260 generates or updates a badge corresponding to the icon of the appropriate type. In various embodiments, the badge represents a number of updates of the type corresponding to the icon that the application has received since that application was last in the foreground on the device.

At operation 308, the user interface customization module 256 configures the operating system to present the update image instead of or in conjunction with an application image in a multitasking user interface. For example, if the application is an iOS application, the user interface customization module 256 may configure the multitasking user interface of the operating system such that the multitasking user interface uses the update image instead of an application image (e.g., instead of a snapshot of the user interface that was taken by the operating system when the application was placed into the background on the device). As another example, the user interface customization module 256 may overlay the update image generated by the application over the application image generated by the operating system. As another example, the user interface customization module 256 may replace a portion of the application image with the update image. Thus, upon requesting to view the multitasking user interface of the operating system (e.g., by double-clicking the Home button on an iPhone), the user may be presented information pertaining to update data that was received by the application while the application was in the background. Thus, the user may be presented with more information about the current state of the application before making a decision to bring the application to the foreground.

In various embodiments, the user interface customization module 256 may present the update image independently of any multitasking user interfaces presented by the operating system. For example, the user interface customization module 256 may present the update image based on a determination that the user is about to select an application to move into the foreground on the device. The user interface customization module 256 may make this determination based on communication with the operating system (e.g., via APIs, callbacks, or events supported by the operating system).

Figure 4:
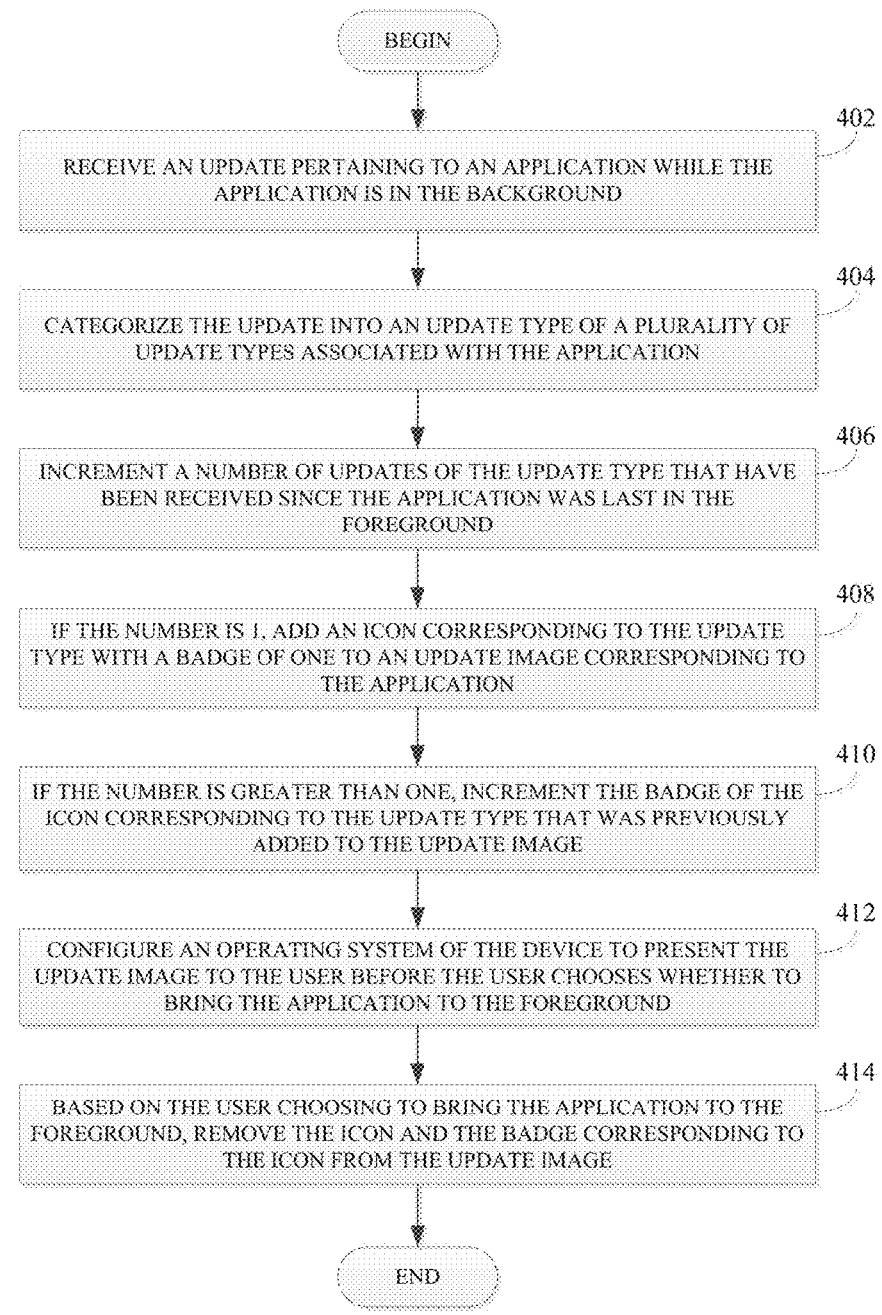
FIG. 4 is a flow diagram illustrating an additional example method of customizing a multitasking user interface of an operating system based on an update received by an application while the application is in the background.

FIG. 4 is a flow diagram illustrating an example method 400 of customizing a multitasking user interface of an operating system based on an update received by an application while the application is in the background. In various embodiments, the method 400 may be implemented by one or more of modules of the client application 252 depicted in FIG. 2.

At operation 402, the reception module 256 receives an update pertaining to the application while the application is in the background.

At operation 404, the categorization module 258 categorizes the update according to its type. The possible update categories may be defined by the application. Thus, for example, a LinkedIn application may define categories for update data pertaining to new invitations to connect, messages received, jobs updated, newsfeed content/stories, who's viewed your profile, group discussions, people you may know, endorsements, and so on.

At operation 406, the categorization module 258 increments a number of updates of the update type that have been received since the application was last in the foreground. Alternatively, the categorization module increments a number of updates of the update type that have been received since the number of updates for the update type was last presented.

At operation 408, based on the number being one (e.g., based on a determination that this is the first update of the type since the application was last in the foreground or since the number of updates corresponding to the type was last viewed), the user interface customization module 260 updates an update image corresponding to the application to include an icon corresponding to the update type having a badge of one.

At operation 410, based on the number being greater than one, the user interface customization module 260 increments the badge in the update image of the icon corresponding to the update type.

At operation 412, the user interface customization module 260 configures the operating system of the device to present the update image to the user before the user chooses whether to bring the application to the foreground. For example, the user interface customization module 260 customizes a multitasking user interface of the operating system to use or incorporate the update image, as described above with respect to FIG. 3.

At operation 414, the user interface customization module 260 removes the icon and the badge corresponding to the icon from the update image based on the user choosing to bring the application to the foreground (or, alternatively, based on the update image having been presented to the user).

Figure 5:
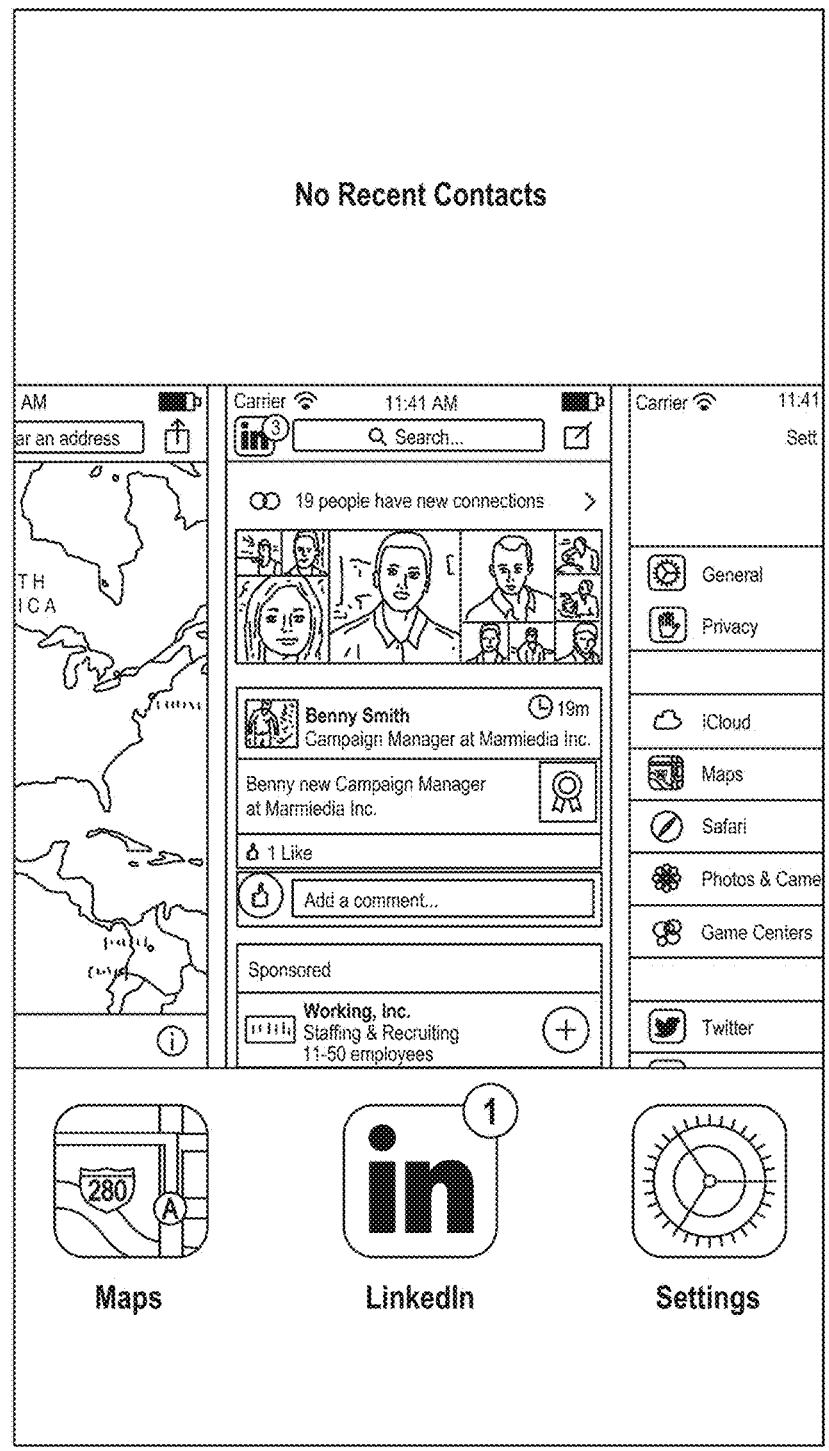
FIG. 5 is a screenshot of an example multitasking user interface of an operating system.

FIG. 5 is a screenshot of an example multitasking user interface 500 of an operating system (e.g., the iOS 7 operating system). As shown, the multitasking user interface includes an icon corresponding to each one or more applications in a bottom pane of the user interface. Here, three application icons are shown in the bottom pane: an icon for a Maps application, an icon for a LinkedIn application, and an icon for a Settings application.

Above each icon, the operating system displays an application image. In various embodiments, the application image is a screenshot of a last user interface of the application that was shown to the user before the application was placed into the background.

In various embodiments, one or more of the icons or application images are selectable by the user to bring the application to the foreground on the device.

As shown, the LinkedIn icon includes a badge of "1." In various embodiments, this badge indicates that one update has been received by the application since the application was last in the foreground on the device (or, alternatively, since the user last viewed the number of updates in the multitasking user interface).

Figure 6:
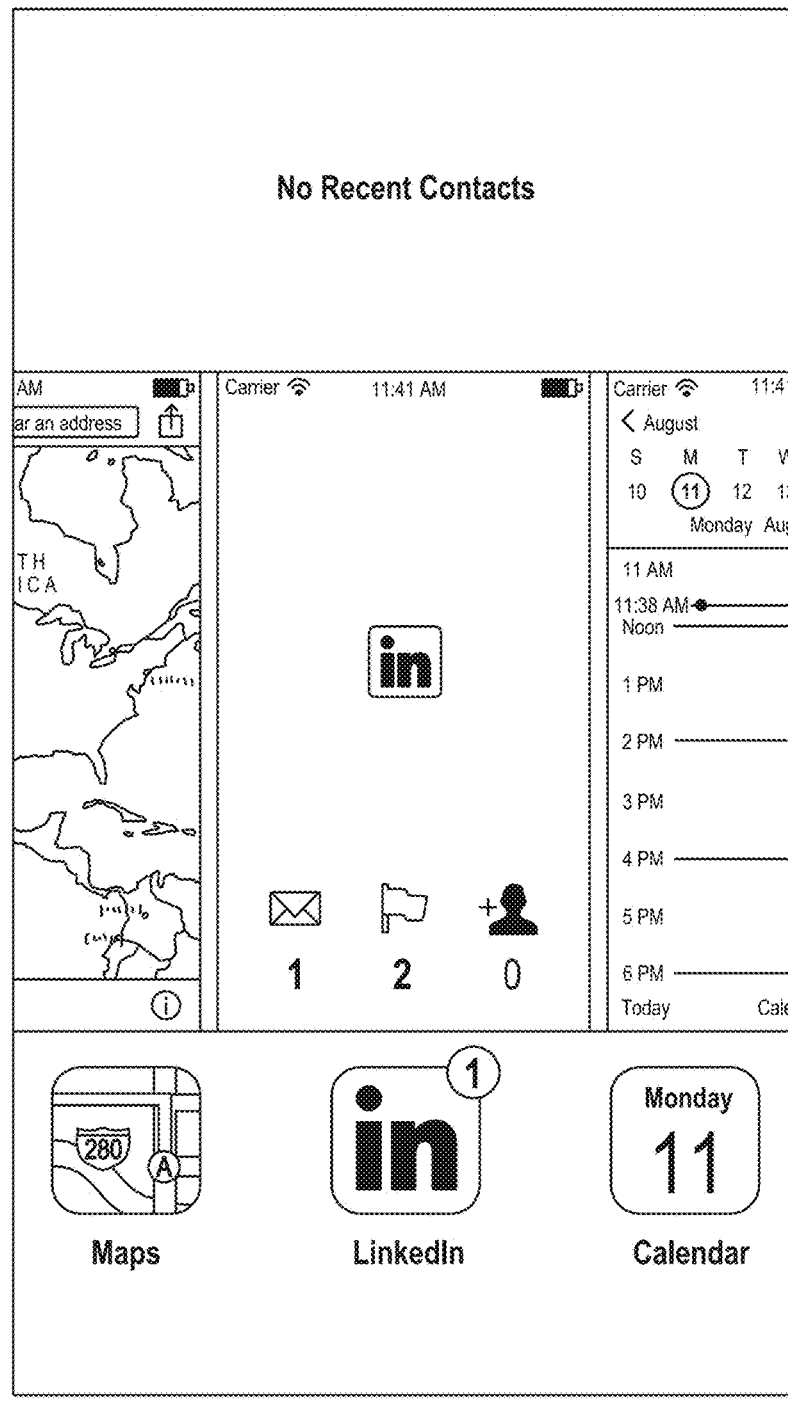
FIG. 6 is a screenshot of an example multitasking user interface of an operating system.

FIG. 6 is a screenshot of an example multitasking user interface 600 of an operating system (e.g., the iOS 7 operating system). As shown in FIG. 6, the application has replaced the default application image (e.g., the screenshot of the last user interface of the application as taken by the operating system) for the LinkedIn application with an update image generated by the LinkedIn application. As shown in FIG. 6, the update image includes icons corresponding to categories of data that has been updated since the application was last in the foreground. The icons include a new message icon, a new notification icon, and a new connection request icon. The new message icon has a badge of 1, indicating that 1 new message has been received. The notification icon includes a badge of 2, indicating that 2 new notifications have been received. The connection request icon has a badge of 0, meaning no new connection requests have been received. In various embodiments, this user interface is presented to the user based on a request by the user to select an application to bring to the foreground (e.g., based on the user double-clicking the Home button of an iOS device). Although this example depicts the operating system of the device being configured to include the update image in the operating system's multitasking user interface, the update image generated by the application may also be presented independently of the operating system's multitasking user interface (e.g., in a user interface presented b—the application in response to a detection of a request by the user to bring an application to the foreground).

Figure 7:
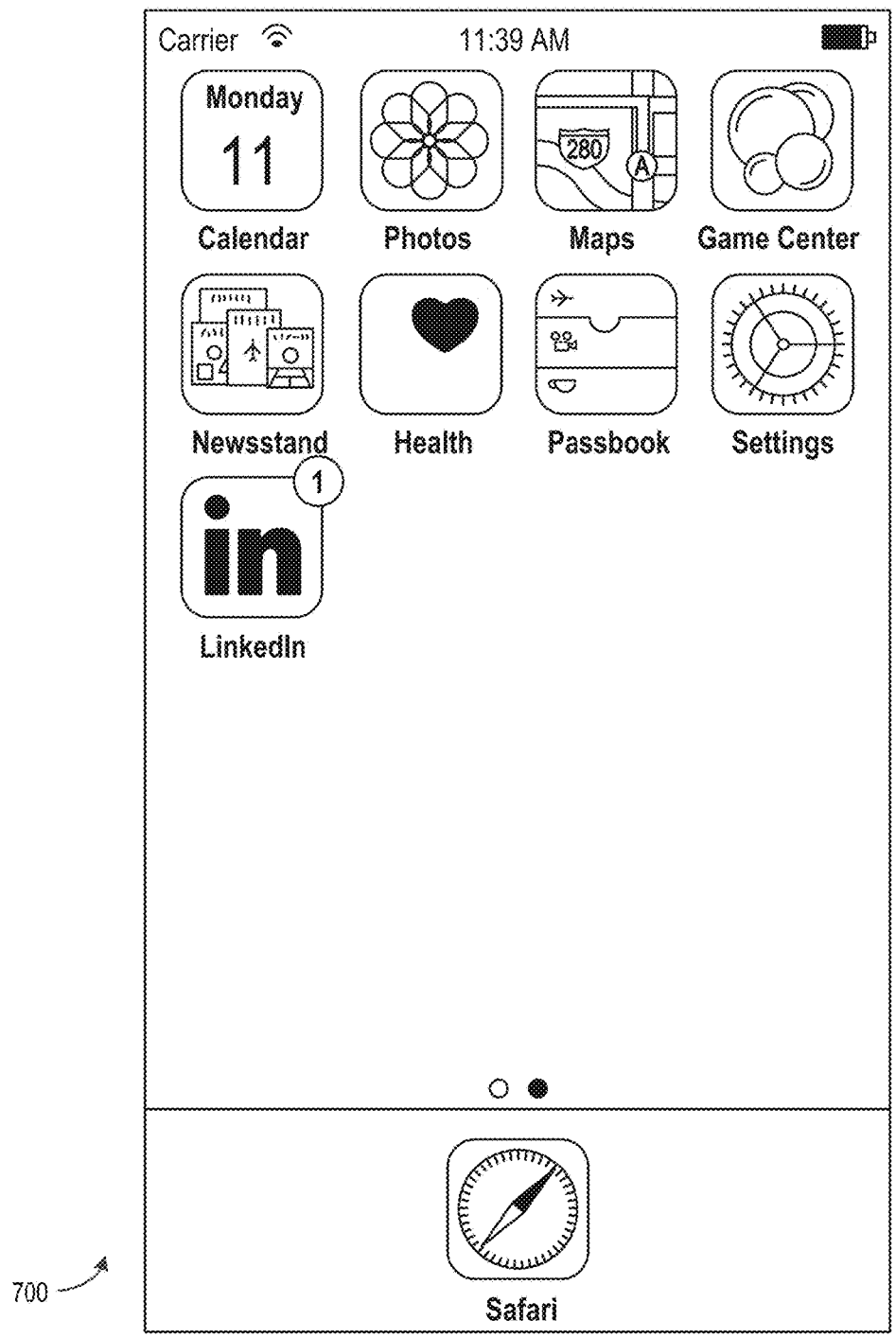
FIG. 7 is a screenshot of an application launching user interface of an operating system.

FIG. 7 is a screenshot of an application launching user interface of an operating system. Here, an icon corresponding to the LinkedIn application has a badge of 1, indicating that one update has been received by the LinkedIn application. However, from the application launching user interface of the operating system, the user may not be able to determine the type of the update received or the state of the application as it was last left.

Figure 8:
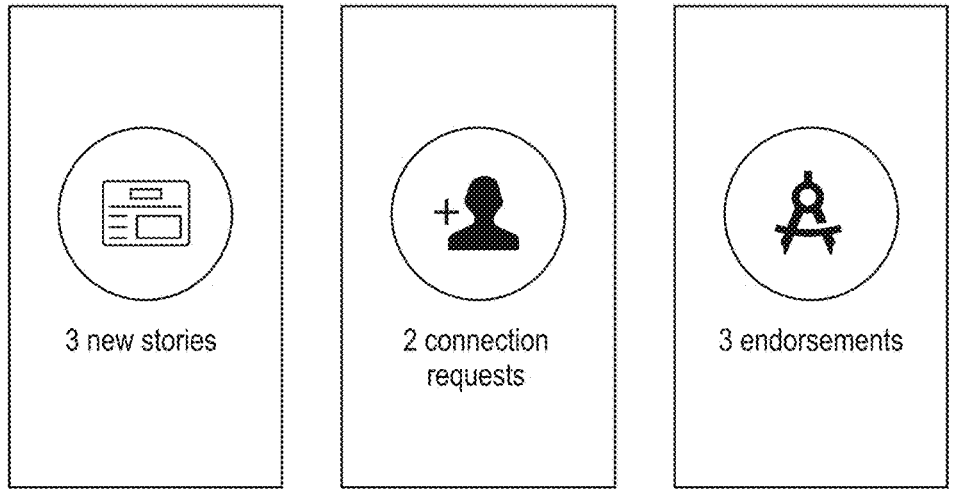
FIG. 8 is a screenshot of icons and textual data that may be included in an update image.

FIG. 8 is a screenshot of icons and textual data that may be included in an update image. As shown in FIG. 8, various icons representing a type of update received may be included in an update image. The icons shown include a newsfeed icon, a connection requests icon, and an endorsements icon, Here, instead of including badges, these icons are presented with textual information identifying a number of updates received. For example, beneath the newsfeed icon, the text states "3 new stories," beneath the connection requests icon, the text states "2 connection requests," and beneath the endorsements icon, the text states "3 endorsements." In various embodiments, one or more of these icons may be incorporated into the update image (e.g., based one or more criteria, such as number of updates received, importance of the updates (as determined based on data transferred with the updates or user preferences).

The various operations of the example methods described herein may be performed, at least partially, by one or more processors that are temporarily configured (e.g., by software instructions) or permanently configured to perform the relevant operations. Whether temporarily or permanently configured, such processors may constitute processor-implemented modules or objects that operate to perform one or more operations or functions, Time modules and objects referred to herein may, in some example embodiments, comprise processor-implemented modules and/or objects.

Similarly, the methods described herein may be at least partially processor-implemented. For example, at least some of the operations of a method may be performed by one or more processors or processor-implemented modules. The performance of certain operations may be distributed among the one or more processors, not only residing within a single machine or computer, but deployed across a number of machines or computers. In some example embodiments, the processor or processors may be located in a single location (e.g., within a home environment, an office environment or at a server farm), while in other embodiments the processors may be distributed across a number of locations.

The one or more processors may also operate to support performance of the relevant operations in a "cloud computing" environment or within the context of "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs)).

Figure 9:
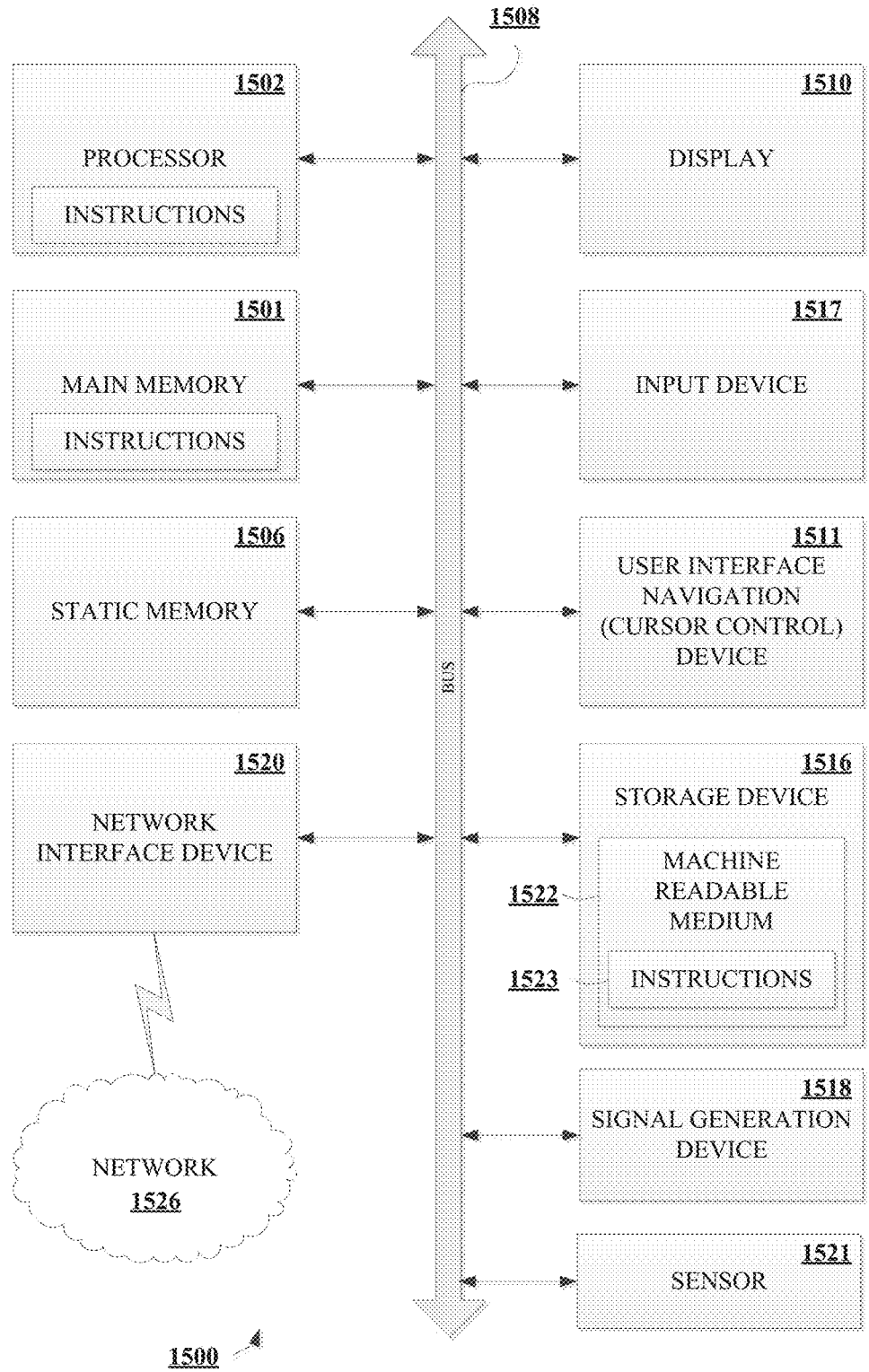
FIG. 9 is a block diagram of a machine in the form of a computing device within which a set of instructions, for causing the machine to perform any one or more of the methodologies discussed herein, may be executed.

FIG. 9 is a block diagram of a machine in the form of a computer system within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in a client-server network environment, or as a peer machine in peer-to-peer (or distributed) network environment. In a preferred embodiment, the machine will be a server computer, however, in alternative embodiments, the machine may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1500 includes a processor 1502 (e.g., a central processing unit (CPU), a graphics processing unit (GPU) or both), a main memory 1501 and a static memory 1506, which communicate with each other via a bus 1508. The computer system 1500 may further include a display unit 1510, an alphanumeric input device 1517 (e.g., a keyboard), and a user interface (UI) navigation device 1511 (e.g., a mouse). In one embodiment, the display, input device and cursor control device are a touch screen display. The computer system 1500 may additionally include a storage device 1516 (e.g., drive unit), a signal generation device 1518 (e.g., a speaker), a network interface device 1520, and one or more sensors 1521, such as a global positioning system sensor, compass, accelerometer, or other sensor.

The drive unit 1516 includes a machine-readable medium 1522 on which is stored one or more sets of instructions and data structures (e.g., software 1523) embodying or utilized by any one or more of the methodologies or functions described herein. The software 1523 may also reside, completely or at least partially, within the main memory 1501 and/or within the processor 1502 during execution thereof by the computer system 1500, the main memory 1501 and the processor 1502 also constituting machine-readable media.

While the machine-readable medium 1522 is illustrated in an example embodiment to be a single medium, the term "machine-readable medium" may include a single medium or multiple media (e.g., a centralized or distributed database, and/or associated caches and servers) that store the one or more instructions. The term. "machine-readable medium" shall also be taken to include any tangible medium that is capable of storing, encoding or carrying instructions for execution by the machine and that cause the machine to perform any one or more of the methodologies of the present disclosure, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

The software 1523 may further be transmitted or received over a communications network 1526 using a transmission medium via the network interface device 1520 utilizing any one of a number of well-known transfer protocols (e.g., HTTP). Examples of communication networks include a local area network. ("LAN"), a wide area network ("WAN"), the Internet, mobile telephone networks, Plain Old Telephone (POTS) networks, and wireless data networks (e.g., Wi-Fi® and WiMax® networks). The term "transmission medium" shall be taken to include any intangible medium that is capable of storing, encoding or carrying instructions for execution by the machine, and includes digital or analog communications signals or other intangible medium to facilitate communication of such software.

Although embodiments have been described with reference to specific examples, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A method comprising:
   receiving an update data item pertaining to an application placed into the background of an operating system of a device, information pertaining to the update data item not included in a snapshot of a user interface of the application taken by the operating system when the application was placed into the background of the device, the information including an update category;
   generating an update image that includes the information pertaining to the update data item, the update image being a custom image configured to be overlaid over or to replace the snapshot, the update image including a user interface element corresponding to the update category and a user interface element representing a quantity of update items received in the update category since the application was placed into the background of the device; and
   incorporating the update image into a multitasking user interface of the operating system to allow the user to determine the update category and the quantity of update items received in the update category, in addition to a state of the application when it was placed into the background of the device, before choosing whether to bring the application to the foreground, the incorporating of the update image into the multitasking user interface including replacing the snapshot with the update image or overlaying the update image over the snapshot, the incorporating of the update image into the multitasking user interface being performed by one or more processors.

2. The method of claim 1, wherein the user interface element corresponding to the update category is an icon and the user interface corresponding to the quantity of update items received in the update category is a badge corresponding to the icon.

3. The method of claim 1, wherein the update category is one of a plurality of update categories, the plurality of update categories pertaining to at least two of new stories, new connection requests, or new endorsements associated with a member profile of the user.

4. The method of claim 1, further comprising, based on a detection that the application was placed into the foreground of the operating system, removing the user interface element corresponding to the category.

5. The method of claim 1, further comprising configuring the operating system to allow the application to receive updates while placed in the background of the operating system and wherein the receiving of the update data item is based on the configuring.

6. A system comprising:
one or more modules implemented by one or more processors, the one or more modules configured to, at least:
receive an update data item pertaining to an application placed into the background of an operating system of a device, information pertaining to the update data item not included in a snapshot of a user interface of the application taken by the operating system when the application was placed into the background of the device;
generate an update image that includes information pertaining to the update data item, the update image being a custom image configured to replace the snapshot, the update image including a user interface element corresponding to the update category and a user interface element representing a quantity of update items received in the update category since the application was placed into the background of the device; and
incorporate the update image into a multitasking user interface of the operating system to allow the user to determine the update category and the quantity of update items received in the update category, in addition to a state of the application when it was placed into the background of the device, before choosing whether to bring the application to the foreground, the incorporating of the update image into the multitasking user interface including replacing the snapshot with the update image or overlaying the update image over the snapshot.

7. The system of claim 6, wherein the user interface element corresponding to the update category is an icon and user interface corresponding to the quantity of update items received in the update category is a badge corresponding to the icon.

8. The system of claim 6, wherein the update category is one of a plurality of update categories, the plurality of update categories pertaining to at least two of new stories, new connection requests, or new endorsements associated with a member profile of the user.

9. The system of claim 6, the one or more modules further configured to, based on a detection that the application was placed into the foreground of the operating system, remove the user interface element corresponding to the category.

10. The system of claim 6, the one or more modules further configured to configure the operating system to allow the application to receive updates while placed in the background of the operating system and wherein the receiving of the update data item is based on the configuring.

11. A non-transitory computer-readable storage medium storing instructions thereon, which, when executed by one or more processors, cause the one or more processors to perform operations, the operations comprising:
receiving an update data item pertaining to an application placed into the background of an operating system of a device, information pertaining to the update data item not included in a snapshot of a user interface of the application taken by the operating system when the application was placed into the background of the device, the information including an update category;
generating an update image that includes the information pertaining to the update data item, the update image being a custom image configured to be overlaid over or to replace the snapshot, the update image including a user interface element corresponding to the update category and a user interface element representing a quantity of update items received in the update category since the application was placed into the background of the device; and
incorporating the update image into a multitasking user interface of the operating system to allow the user to determine the update category and the quantity of update items received in the update category, in addition to a state of the application when it was placed into the background of the device, before choosing whether to bring the application to the foreground, the incorporating of the update image into the multitasking user interface including replacing the snapshot with the update image or overlaying the update image over the snapshot.

12. The non-transitory computer-readable storage medium of claim 11, wherein the user interface element corresponding to the update category is an icon and the user interface corresponding to the quantity of update items received in the update category is a badge corresponding to the icon.

13. The non-transitory computer-readable storage medium of claim 11, wherein the update category is one of a plurality of update categories, the plurality of update categories pertaining to at least two of new stories, new connection requests, or new endorsements associated with a member profile of the user.

14. The non-transitory computer-readable storage medium of claim 11, further comprising, based on a detection that the application was placed into the foreground of the operating system, removing the user interface element corresponding to the category.

* * * * *

UNITED STATES PATENT AND TRADEMARK OFFICE
CERTIFICATE OF CORRECTION

PATENT NO. : 9,830,167 B2
APPLICATION NO. : 14/534070
DATED : November 28, 2017
INVENTOR(S) : Taylor et al.

Page 1 of 1

It is certified that error appears in the above-identified patent and that said Letters Patent is hereby corrected as shown below:

On the Title Page

Item (57), in "Abstract", in Column 2, Line 1, delete "mufti-tasking" and insert --multi-tasking-- therefor Signed and Sealed this
Twenty-eighth Day of May, 2019

Andrei Iancu
*Director of the United States Patent and Trademark Office*